US006747829B2

United States Patent
Stanek et al.

(10) Patent No.: US 6,747,829 B2
(45) Date of Patent: Jun. 8, 2004

(54) PAD ELIMINATING DECODING METHOD AND APPARATUS FOR A DIRECT ACCESS STORAGE DEVICE

(75) Inventors: David James Stanek, Rochester, MN (US); Weldon Mark Hanson, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 285 days.

(21) Appl. No.: 09/896,465

(22) Filed: Jun. 29, 2001

(65) Prior Publication Data

US 2003/0002191 A1 Jan. 2, 2003

(51) Int. Cl.$^7$ ................................................. G11B 5/09
(52) U.S. Cl. .......................... 360/53; 360/48; 360/51
(58) Field of Search .................... 74/5; 360/48, 51, 360/53

(56) References Cited

U.S. PATENT DOCUMENTS

| | | | |
|---|---|---|---|
| 4,974,197 A | | 11/1990 | Blount et al. |
| 5,133,060 A | | 7/1992 | Weber et al. |
| 5,210,660 A | | 5/1993 | Hetzler |
| 5,237,675 A | | 8/1993 | Hannon, Jr. |
| 5,283,646 A | | 2/1994 | Bruder |
| 5,301,310 A | * | 4/1994 | Isman et al. ................ 714/5 |
| 5,341,387 A | | 8/1994 | Nguyen |
| 5,343,340 A | | 8/1994 | Boutaghou et al. |
| 5,384,669 A | * | 1/1995 | Dunn et al. ................ 360/48 |
| 5,388,013 A | | 2/1995 | Nakamura |
| 5,442,492 A | | 8/1995 | Cunningham et al. |
| 5,535,369 A | | 7/1996 | Wells et al. |
| 5,619,539 A | | 4/1997 | Coker et al. |
| 5,627,695 A | * | 5/1997 | Prins et al. .................... 360/51 |
| 5,689,532 A | | 11/1997 | Fitzpatrick |
| 5,742,443 A | | 4/1998 | Tsao et al. |
| 5,857,002 A | | 1/1999 | Melas |
| 5,911,150 A | | 6/1999 | Peterson et al. |
| 5,949,831 A | | 9/1999 | Coker et al. |

FOREIGN PATENT DOCUMENTS

| | | | | |
|---|---|---|---|---|
| JP | 09065284 A | * | 3/1997 | ............ H04N/5/92 |
| JP | 10041921 A | * | 2/1998 | ............ H04L/1/00 |

OTHER PUBLICATIONS

IBM Technical Disclosure Bulletin, vol. 33, No. 9, Feb. 1991, pp. 158–164.

* cited by examiner

Primary Examiner—David Hudspeth
Assistant Examiner—Rocio Colon
(74) Attorney, Agent, or Firm—Mark A. Hollingsworth

(57) ABSTRACT

An apparatus and method for transferring data between a read/write transducer coupled to a data channel and a data storage medium eliminates the necessity of a data sector block coding pad field. A data sector is received during a read operation. A disable signal associated with a last block of the data sector is generated. In response to the disable signal, data correction, such as parity correction, to the last block of the data sector is disabled. Data correction is enabled for application to blocks of the data sector other than the last block. Generating the disable signal involves identifying the last block of the data sector, which may be accomplished by detecting a change of state of a read gate input into the data channel or by use of a counter. The apparatus and method of the present invention may be embodied within a data channel of a data storing system, such as a direct access storage system.

25 Claims, 9 Drawing Sheets

PAD ELIMINATING DECODING METHOD AND APPARATUS FOR A DIRECT ACCESS STORAGE DEVICE

FIELD OF THE INVENTION

The present invention relates generally to data storage systems and, more particularly, to a system and method for decoding encoded data blocks that eliminates the need for block coding pad bytes in the decoding process.

BACKGROUND OF THE INVENTION

A typical data storage system includes a magnetic medium for storing data in magnetic form and a transducer used to write and read magnetic data respectively to and from the medium. A typical disk storage device, for example, includes one or more data storage disks coaxially mounted on a hub of a spindle motor. The spindle motor rotates the disks at speeds typically greater than several thousand revolutions-per-minute (RPM).

Digital information is typically stored in the form of magnetic transitions on a series of concentric, spaced tracks formatted on the surface of the magnetizable rigid data storage disks. The tracks are generally divided into a number of sectors, with each sector comprising a number of information fields, including fields for storing data, and sector identification and synchronization information, for example.

An actuator assembly typically includes a plurality of outwardly extending arms with one or more transducers and slider bodies being mounted on flexible suspensions. The slider body lifts the transducer head off the surface of the disk as the rate of spindle motor rotation increases, and causes the head to hover above the disk on an air bearing produced by high speed disk rotation.

In a typical data storage device, such as a direct access storage device (DASD) or other magnetic or optical storage device, data is typically stored in data sectors. In addition to storing customer data, each data sector typically includes a number of fields that store specific types of information that facilitate recovery of customer data during the readback process. Such fields may, for example, include one or more synchronization fields, an error correction code (ECC) field, a cyclic redundancy code (CRC) field, and a pad field.

Conventional data channel detector implementations typically require additional data or "pad" to be written to a data sector following writing of the customer data and ECC fields in order to allow the channel's detector to decode the last bytes of data written to the sector. The purpose of the pad is to provide sample values to the channel's detector and/or parity circuits for purposes of resolving pending decisions at the end of a data read operation.

In state of the art DASD read/write channels, parity encoding schemes are employed which use large block sizes to improve code rate efficiency. In such schemes, the encoding process does not require a full block of data be written to the disk. In accordance with current decoding processes which employ parity information to correct errors in the block, however, it is a requirement that a full block of data be read prior to transferring customer data.

The use of large block sizes, such as 12 byte blocks in certain designs, limits the granularity of available sector sizes. In cases where the needed number of bytes does not fit a modulus of the block size, for example, an appropriate number of pad bytes are added to meet the requirement. If the pad was not added, a read operation would return erroneous data due to the last block being incomplete and would most likely have incorrect parity information resulting in miscorrected data being transferred out.

It is appreciated by those skilled in the art that this pad represents wasted space that could otherwise be allocated for storing customer data or other needed information. Inclusion of such pad degrades format efficiency. In current DASD designs, there is no practicable way to completely eliminate the need for pad due to varied data rates, split sectors, and customer requests for non-standard sector sizes, among other reasons. The use of smaller block sizes has several disadvantages as well, including lower code rate efficiency and/or degraded error rate performance, both of which degrade format efficiency.

There is a need for an improved data storage formatting approach which provides for increased data sector format efficiency and sector size granularity. There exists a further need for such an approach that provides for increased customer data storage capacity, and one that allows designers to implement more efficient coding schemes without incurring loss of format efficiency due to the requirement to add pad at the end of a data sector. The present invention fulfills these and other needs.

SUMMARY OF THE INVENTION

The present invention is directed to an apparatus and method for transferring data between a read/write transducer and a data storage medium which provide for an improvement in track format efficiency. The present invention is also directed to such an apparatus and method that provides for increased sector size granularity.

An apparatus and method of the present invention provide for transferring of data between a read/write transducer coupled to a data channel and a data storage medium without necessity of a data sector block coding pad field. According to the present invention, a data sector is received during a read operation. A disable signal associated with a last block of the data sector is generated. In response to the disable signal, data correction, such as parity correction, to the last block of the data sector is disabled. Data correction is enabled for application to blocks of the data sector other than the last block.

Generating the disable signal involves identifying the last block of the data sector. According to one embodiment, a disable signal is generated in response to detecting a change of state of a read gate input into the data channel. For example, the disable signal is generated in response to the read gate input changing state from an active state to an inactive state. According to this embodiment, generating the disable signal may further involve enabling data correction to a block proceeding and adjacent to the last block. The disable signal is generated prior to or during application of data correction to the block proceeding and adjacent to the last block. Data correction is disabled to the last block of the data sector in response to the disable signal.

According to another embodiment, a counting approach is employed to identify the last block of a data sector. According to one counting approach, the data sector has a predefined size, and generating the disable signal involves determining an expected amount of data that will be read during the read operation and counting an amount of data transferred out of the data channel during the read operation. The start of the last block is detected using the counted amount of transferred data. Data correction to the last block is disabled if the expected amount of data is not an integer multiple of the predefined size of the data sector.

In accordance with a further embodiment of the present invention, an apparatus is employed in a data channel for processing readback signal information developed from a data storage medium during a read operation. The apparatus includes a detector that detects an encoded data stream developed from a readback signal, where the encoded data stream includes a number of encoded data blocks. A processor is coupled to the detector. The processor includes a parity check unit that detects parity of the encoded data blocks and a data correction unit that operates on a particular encoded data block in response to the parity check unit detecting incorrect parity of the particular encoded data block. The apparatus further includes a disable circuit coupled to the parity check unit and the data correction unit. The disable circuit generates a disable signal associated with a last block of the encoded data blocks, and the data correction unit disables data correction to the last block in response to the disable signal.

The disable circuit, according to one embodiment, includes an input coupled to a read gate input to the data channel. The disable circuit includes a detector that detects a state change of the read gate input. The disable circuit generates a disable signal in response to the detected state change of the read gate input, such as a state change from an active state to an inactive state. In one configuration, the disable circuit may be coupled to the read gate input to the data channel and a timer in the data channel. In this configuration, the disable circuit generates the disable signal in response to a state change of the read gate input and transmits the disable signal to the data correction unit upon expiration of the timer. The timer expires after a period of time corresponding to a processing delay of a decoder coupled to an output of the processor.

According to a further embodiment, the disable circuit includes a counter, such as a byte counter. The disable circuit generates a disable signal in response to the counter identifying the last block of the encoded data blocks. For example, the counter counts an amount of data transferred out of the data channel during the read operation and detects a start of the last block using the counted amount of transferred data and an expected amount of data to be read during the read operation. The disable circuit generates a disable signal in response to the expected amount of data not being an integer multiple of a predefined size of the data sector.

In accordance with another embodiment, circuitry and methodologies of the present invention are embodied in a data storing system. The data storing system includes a data storage disk, a transducer supported by a support structure in proximity with the disk, and an actuator that provides relative movement between the transducer and the disk. The data storing system further includes circuitry for processing readback signal information developed by the transducer during a read operation and for selectively disabling data correction to the last block of encoded data blocks as described previously hereinabove.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1:
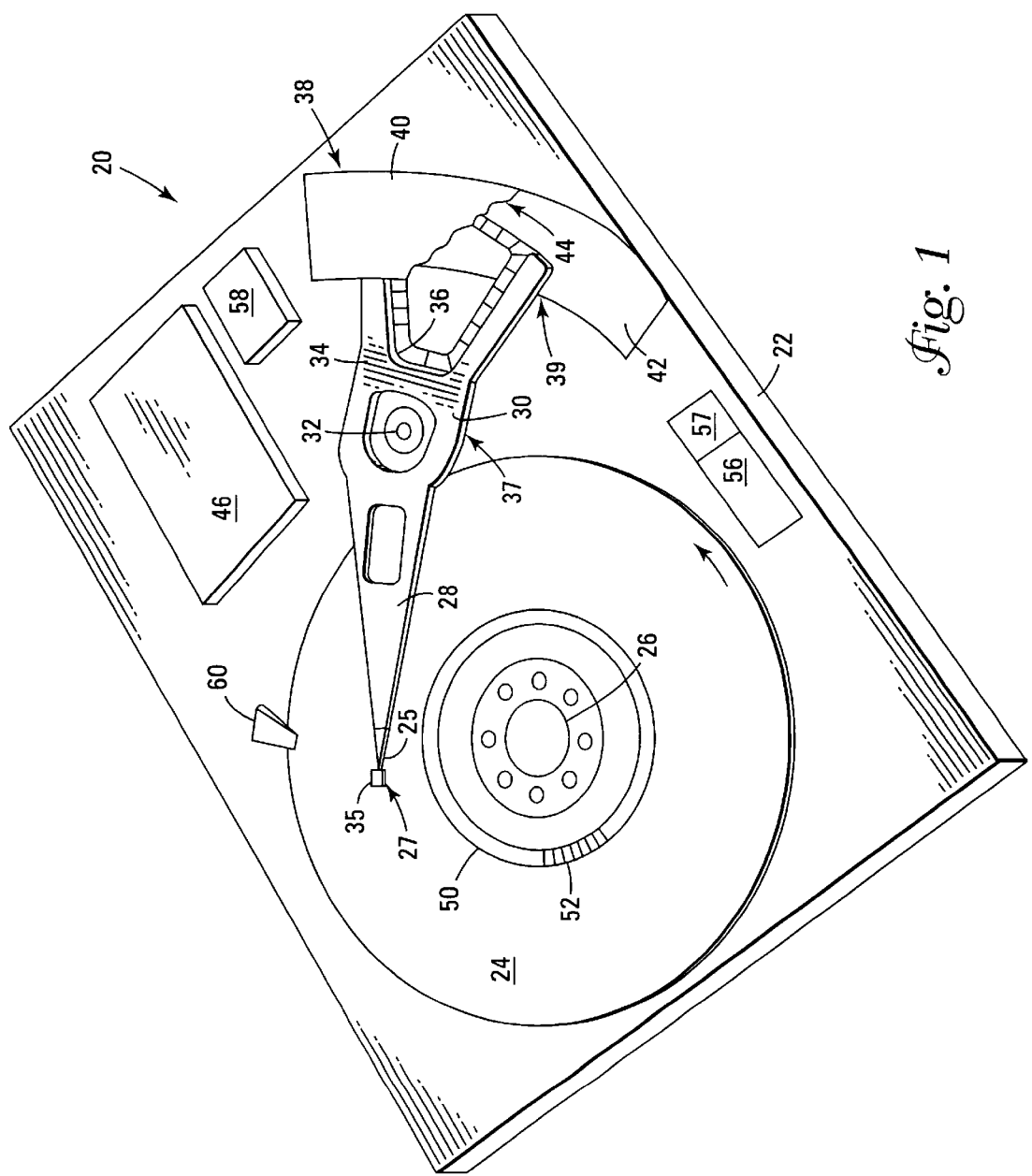
FIG. 1 is a top perspective view of a disk drive system with its upper housing cover removed.

While the invention is amenable to various modifications and alternative forms, specifics thereof have been shown by way of example in the drawings and will be described in detail hereinbelow. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF VARIOUS EMBODIMENTS

In the following description of the illustrated embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

Figure 2:
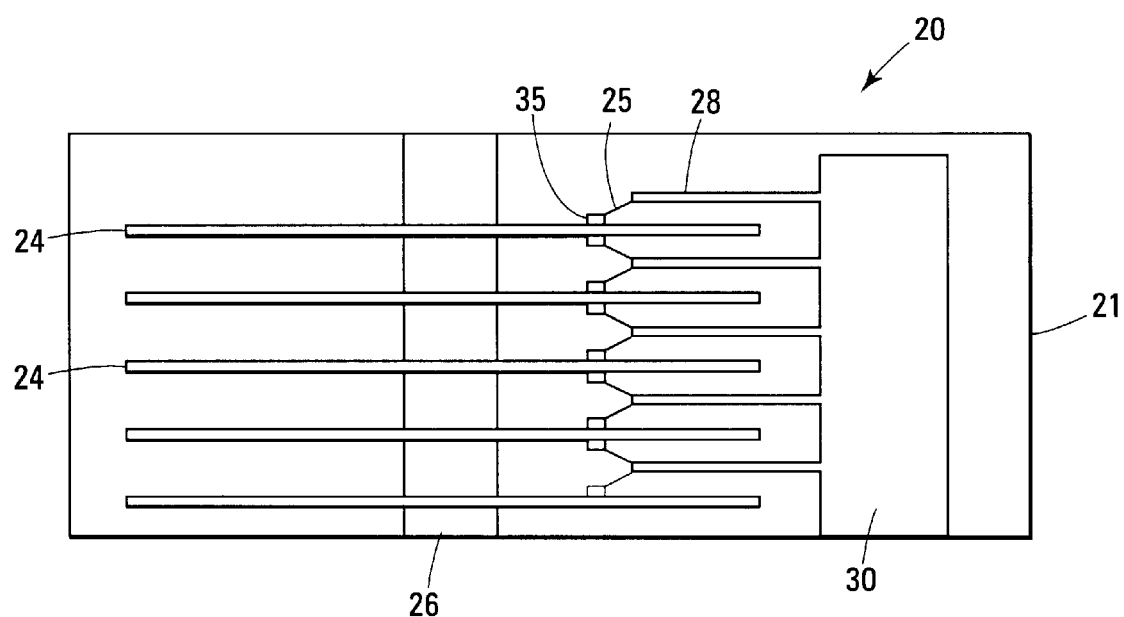
FIG. 2 is a side plan view of a disk drive system comprising a plurality of data storage disks.

Referring to the drawings, and more particularly to FIGS. 1 and 2, there is illustrated a data storage system 20 within which methods and apparatuses according to the present invention may be implemented. The disk drive system 20, as is best shown in FIG. 2, typically includes one or more rigid data storage disks 24 which are stacked coaxially in a tandem spaced relationship, and rotate about a spindle motor 26 at a relatively high rate of rotation.

As is depicted in FIG. 1, each disk 24 is typically magnetically formatted to include a plurality of spaced concentric tracks 50. One or more of the disks 24 may alternatively be magnetically formatted to include a spiraled track configuration, or a combination of concentric and spiraled track configurations. Digital information is typically stored in the form of magnetic transitions along the tracks 50. The tracks 50 are generally divided into a number of sectors 52, with each sector 52 comprising a number of information fields, including fields for storing data, and sector identification and synchronization information, for example.

Writing data to a magnetic data storage disk 24 generally involves passing a current through the write element of the transducer assembly 27 to produce magnetic lines of flux which magnetize a specific location of the disk surface 24. Reading data from a specified disk location is typically accomplished by a read element of the transducer assembly 27 sensing the magnetic field or flux lines emanating from the magnetized locations of the disk surface 24. As the read element passes over the rotating disk surface 24, the interaction between the read element and the magnetized locations on the disk surface 24 results in the production of electrical signals, commonly referred to as readback signals, in the read element.

An actuator 30 typically includes a number of interleaved actuator arms 28 with each arm having one or more transducer 27 and slider assemblies 35 mounted to a load beam 25 for transferring information to and from the data storage disks 24. The slider 35 is typically designed as an aerodynamic lifting body that lifts the transducer 27 off the surface of the disk 24 as the rate of spindle motor rotation increases and causes the transducer 27 to hover above the disk 24 on an airbearing produced by high speed rotation of the disk 24. The distance between the slider 35 and the disk surface 24 is typically less than 40 nm.

The actuator 30 is typically mounted to a stationary actuator shaft 32 and rotates on the shaft 32 to move the actuator arms 28 into and out of the stack of data storage disks 24. A coil assembly 36, mounted to a coil frame 34 of the actuator 30, generally rotates within a gap 44 defined between the upper and lower magnet assemblies 40 and 42 of a permanent magnet structure 38 causing the actuator arms 28, in turn, to sweep over the surface of the data storage disks 24. The spindle motor 26 typically comprises a DC motor energized by a power supply 46 and adapted for rotating the data storage disks 24.

The coil assembly 36 and the upper and lower magnet assemblies 40 and 42 of the permanent magnet structure 38 operate in cooperation as an actuator voice coil motor 39 responsive to control signals produced by a servo processor 56. The servo processor 56 controls the direction and magnitude of control current supplied to the voice coil motor 39. The actuator voice coil motor 39 produces a torquing force on the actuator coil frame 34 when control currents of varying direction and magnitude flow in the coil assembly 36 in the presence of a magnetic field produced by the permanent magnet structure 38. The torquing forces imparted on the actuator coil frame 34 cause corresponding rotational movement of the actuator arms 28 in directions dependent on the polarity of the control currents flowing in the coil assembly 36.

The data storage system 20 shown in FIG. 1 preferably employs a closed-loop servo control system for positioning the read/write transducers 27 to specified storage locations on the data storage disk 24. During normal data storage system operation, a servo transducer, generally mounted proximate the read/write transducers, or, alternatively, incorporated as the read element of the transducer assembly 27, is typically employed to read information for the purpose of following a specified track (i.e., track following) and locating (i.e., seeking) specified track and data sector locations on the disk surface 24.

In accordance with one servo technique, embedded servo pattern information is written to the disk 24 along segments extending in a direction generally outward from the center of the disk 24. The embedded servo patterns are thus formed between the data storing sectors of each track 50. It is noted that a servo sector typically contains a pattern of data, often termed a servo burst pattern, used to maintain optimum alignment of the read/write transducers 27 over the centerline of a track 50 when transferring data to and from specified data sectors on the track 50. The servo information may also include sector and track identification codes which are used to identify the location of the transducer assembly 27.

The servo processor 56, which cooperates with channel electronics 57, regulates the actuator voice coil motor 39 to move the actuator arms 28 and transducers 27 to prescribed track 50 and sector 52 locations when reading and writing data to and from the disks 24. The servo processor 56 is loosely coupled to a disk drive controller 58. The disk drive controller 58 typically includes control circuitry and software that coordinate the transfer of data to and from the data storage disks 24. Although the servo processor 56 and disk drive controller 58 are depicted as two separate devices in FIG. 1, it is understood that the functionality of the servo processor 56 and disk drive controller 58 may be embodied in a single multi-purpose processor, which typically results in a reduced component cost.

An apparatus and method in accordance with the principles of the present invention generally provide for improved track format efficiency in a direct access storage device by elimination of the block coding pad field otherwise required to complete the read operation. Pad information typically contains the remainder of an encode/decode block including information required to complete parity correction to the block (block coding pad) and also additional bytes (Viterbi closure pad) required for completion of the data detection operation including finalizing pending decisions within the detector (e.g., Viterbi detector) logic. An apparatus and method according to the present invention are well suited for implementation in-situ a disk drive system of the type described above with reference to FIGS. 1 and 2, it being understood that the invention is not limited to the operating environment described in the above discussion or that provided hereinbelow.

According to the principles of the present invention, and as described in detail hereinbelow, the last block in a read operation is identified. Data correction (e.g., parity correction) to this last block is disabled during processing of the last block to avoid data corruption. Disabling data correction to the last block in a read operation advantageously eliminates the requirement for block coding pad at the expense of a minor error rate performance degradation on the last frame resulting from the lack of parity correction to the last block.

Figure 3:
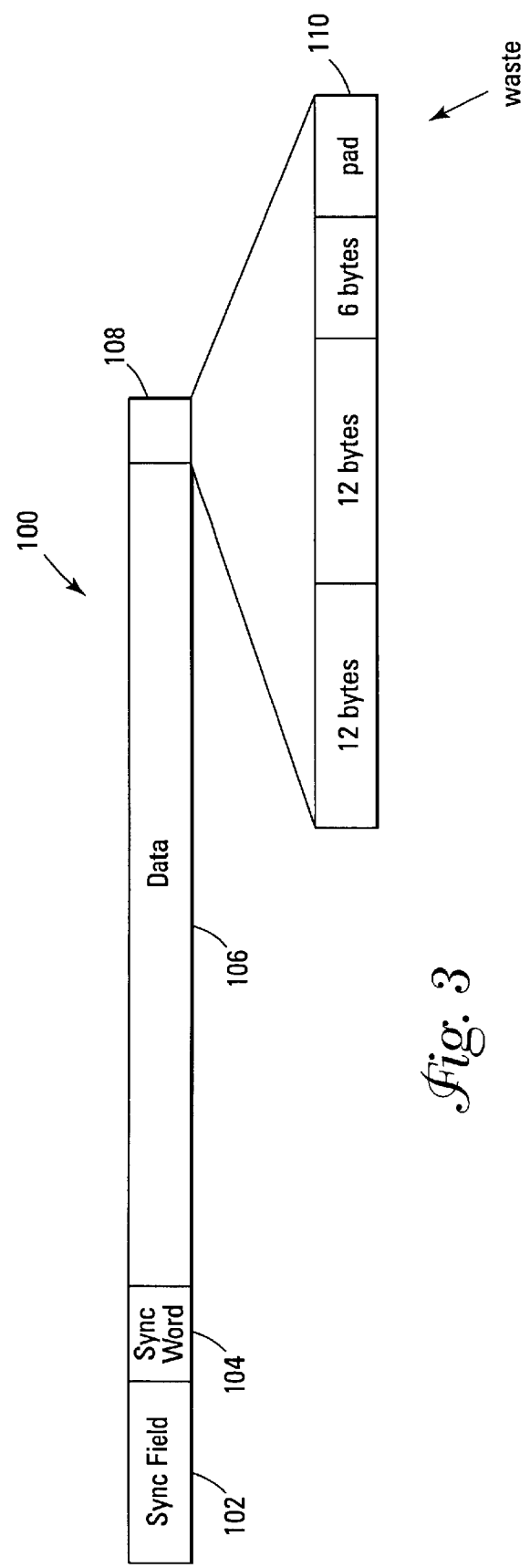
FIG. 3 illustrates various fields of a data sector including block coding pad which is advantageously eliminated by implementing the present invention.

Referring now to FIG. 3, there is depicted a typical data sector 100 of a data track provided on a data storage disk. The data sector 100 preferably conforms to a sector format with large block parity codes (e.g., 12 bytes per block). FIG. 3 illustrates the block coding pad that is advantageously eliminated in accordance with the principles of the present invention. Data is written to a data storage disk according to a sequential format. The data sector 100 shown in FIG. 3, for example, includes a sync field 102, which includes synchronization patterns that allow the channel VFO to acquire the clock frequency, and a sync word 104, which includes a pattern that identifies the start of the encoded customer data. Customer data is stored in a customer data field 106. Error correction code (ECC) (not shown) is typically stored in an ECC field toward the end of the data sector 100, which provides the capability to correct certain errors that occur within the sector 100.

Data sector 100 further includes a block coding pad field 110 which is used in conventional designs to complete readback signal decoding for encoded customer data patterns. Present data channel detector implementations typically require additional pad data to be written after the customer data and ECC fields to allow the channel's detector to decode the last bytes of data written to the data storage disk. In general terms, the purpose of the pad data is to provide sample values to the channel's Viterbi (trellis) and/or parity circuits to resolve pending decisions at the end of a data read operation.

In the illustrative depiction of FIG. 3, an encoding block size of 12 bytes is assumed. At the end of the data sector 100, there are 6 bytes of data that are to be written to the disk. Due to the need to perform a parity check during a read operation, however, an additional 6 bytes of block coding pad must be written to ensure that the parity of the encoded 12 byte block is correct in accordance with a conventional approach. If such additional block coding pad was not written, then during readback, the parity check would quite likely fail, causing the post processor to correct the most likely error in the 12 byte block, which may end up miscorrecting data.

A data track formatting methodology of the present invention advantageously eliminates the block coding pad field required at the end of a data sector to complete readback signal decoding for customer data patterns. Elimination of the block coding pad field improves format efficiency and allows for more customer data to be stored on the media per unit area and allows designers to implement more efficient coding schemes without incurring loss of format efficiency due to the requirement to add block coding pad at the end of a data sector. Also, data sector granularity is increased. Significant improvement in track format efficiency may be realized by implementing the present invention for track formats having increased block sizes. These and other advantages will be readily appreciated by those skilled in the art, as further exemplified in the following discussion.

Figure 4:
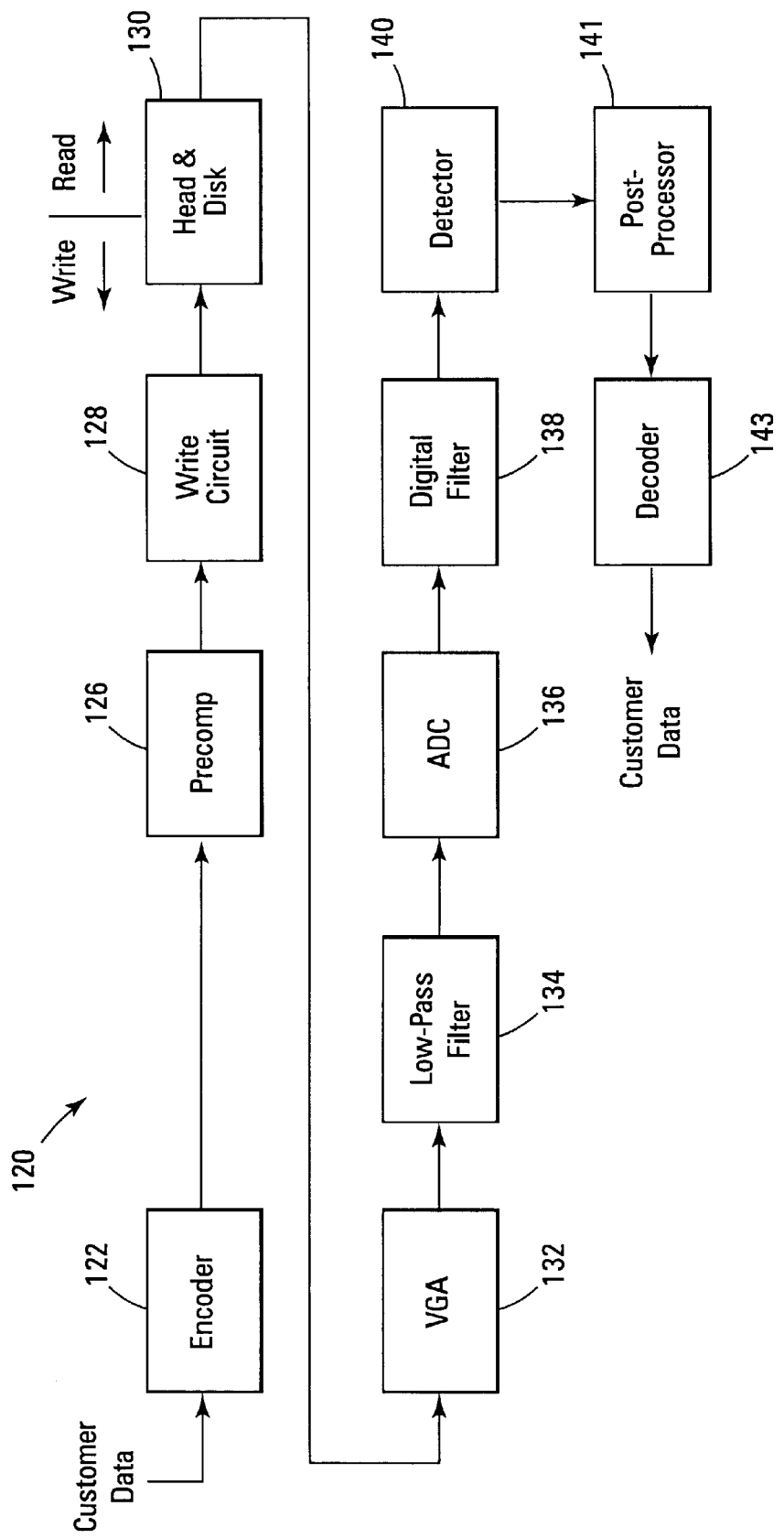
FIG. 4 illustrates various components of a data channel embodying the present invention.

Referring now to FIG. 4, there is illustrated a block diagram of a data channel of a data storage system embodying the present invention. In particular, FIG. 4 shows an embodiment of a partial-response maximum-likelihood (PRML) channel 120 which implements a track formatting methodology in accordance with the principles of the present invention. The channel 120 may be viewed as constituting a portion associated with writing data to a data storage medium and a portion associated with reading data from the medium.

Customer data to be written to the data storage medium is applied to an encoder 122 which encodes the customer data according to a pre-established coding scheme. By way of example, encoder 122 may re-map the customer data to include timing information for purposes of facilitating efficient readback signal processing, improving efficiency, and minimizing error propagation. For example, a 16/17 rate coding scheme may be employed by encoder 122 which encodes 16 customer bits to 17 channel bits to provide the requisite timing information. The encoder 122 converts the encoded binary customer data to a binary write current waveform signal.

The encoder 122 operates on the encoded customer data to enable the magnetic system to mimic a desired partial-response (PR) or extended partial-response (EPR) transfer function in the sampled readback signal. Encoder 122 typically employs a delay circuit which includes an exclusive OR (XOR) circuit to produce a binary write current waveform according to a selected partial-response signaling format. By way of example, encoder 122 may be described by a $1/(1-D^2)$ operation or by a $1/(1-D)$ operation, where D represents a unit delay operator. The encoder 122 mimics the desired partial-response transfer function characteristics by switching the write current such that each binary "1" in the data stream has a non-zero sample in the readback signal. It is understood that encoder 122 may process the encoded customer data according to any of a number of partial-response transfer function specifications, such as a class-4 partial-response (PR4) signaling specification or an extended partial-response class-4 (EPR4) signaling specification.

Encoder 122 is coupled to a precomp circuit 126 which provides an output signal to a write circuit 128 in the form of a modulated binary pulse signal. The write circuit 128 provides the modulated write current signal to a write element of a read/write transducer for writing the processed customer data to the disk surface 130.

Having described the various components and operations associated with writing data to a data storage disk, the following discussion describes various operations associated with reading data from data sectors. A read element of a read/write transducer obtains an analog readback signal from the disk surface 130. The readback signal is applied to a variable gain amplifier (VGA) 132 and the amplified readback signal is applied to a low-pass filter 134. The filtered readback signal is converted to digital form by an analog-to-digital convert (ADC) 136. The converted signal produced by ADC 136 may, for example, provide for 64 possible 6 bit sampled values.

The samples of the ADC 136 are applied to a digital filter 138, such as a 10 tap finite impulse response (FIR) digital filter. The filtered signal produced at the output of digital filter 138 preferably conforms to a selected partial-response signal format (e.g., PR4 or EPR4). The filtered signal produced by the digital filter 138 is then communicated to a Viterbi detector 140.

The Viterbi detector 140 employs a Viterbi algorithm which is used to select the "best value" for an output based upon the minimization of the error term relative to an ideal sample value. Various known Viterbi or maximum likelihood detection algorithms may be employed in connection with the present invention. The Viterbi detector 140 produces an encoded binary data stream representative of the customer data which is subject to processing by a parity post-processor 141 and a decoder 143. The decoded binary data stream representative of the customer data is then transferred to the user via the head-disk controller and interface of the disk drive system.

Figure 5:
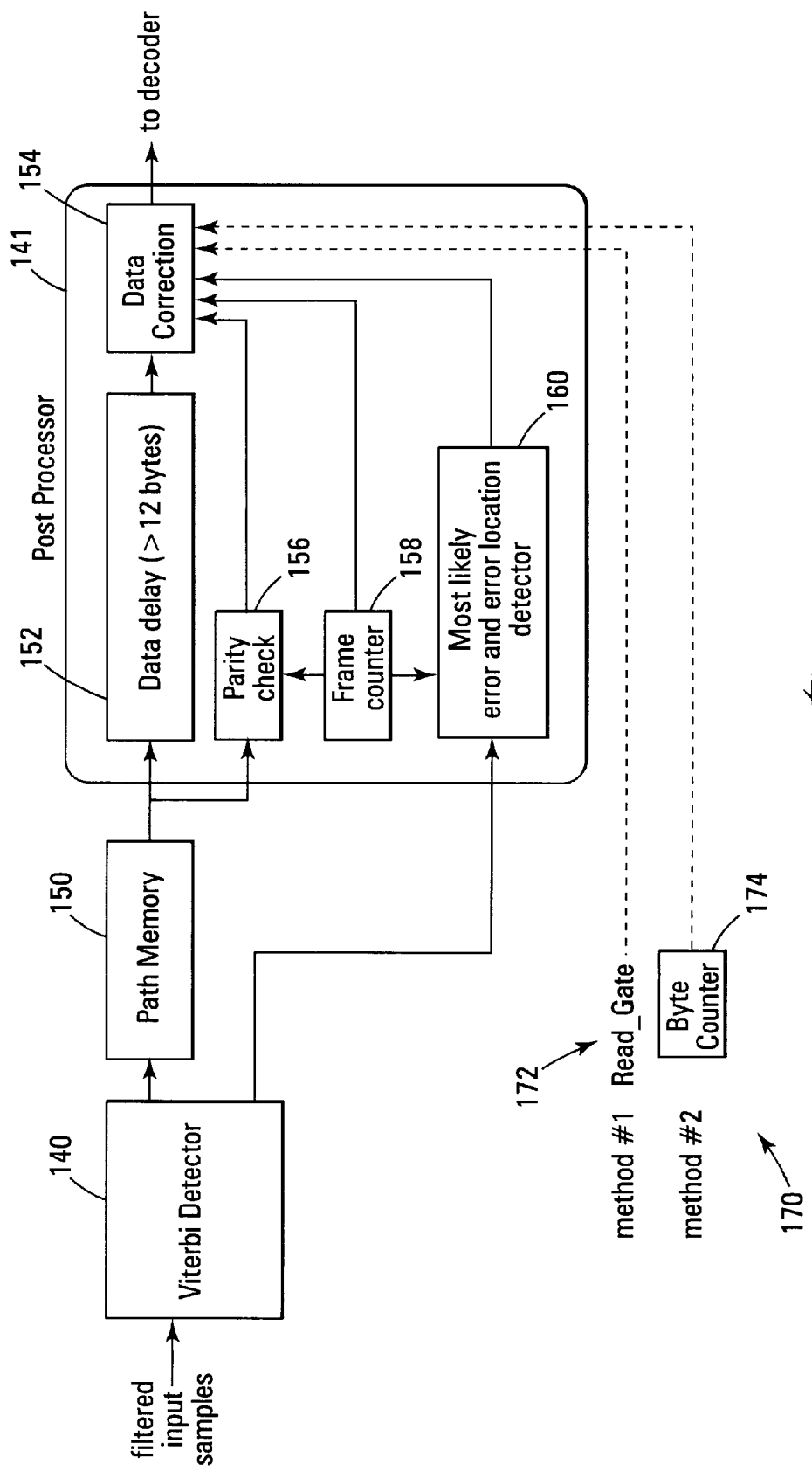
FIG. 5 illustrates various components of a data channel, including components of a post processor, embodying the present invention.

A formatting methodology according to an embodiment of the present invention will now be described in greater detail with reference to FIG. 5. As is shown in FIG. 5, a readback signal is sampled, digitized, filtered and communicated to Viterbi detector 140. Viterbi detector 140, in conjunction with path memory 150, detects the encoded data stream from the filtered readback signal. The encoded data stream output from the path memory 150 is input to the post processor 141. Post processor 141 includes a delay circuit 152 that delays the encoded data stream by the encoded block size (e.g., 12 bytes) plus a short delay due to pipelining.

Post processor 141 includes a frame counter 156 which determines the framing of the encoded blocks. The frame counter 156 effectively determines where the starting bit of each encoded block occurs. A parity check unit 156 is also included within the post processor 141. The parity check unit 156 determines whether or not an encoded block has the correct parity. A error detection circuit 160 of the post processor 141 is provided to determine the most likely error and error location in an encoded block. Error detection circuit 160 uses data from both the path memory 150 and internal metrics from the Viterbi detector 140 in its determinations.

A data correction circuit 154 of the post processor 141 has inputs coupled to the delay circuit 152, parity check unit 156, frame counter 158, and error detection circuit 160. In addition, and in accordance with the present invention, data correction circuit 154 has an input coupled to a disable circuit 170. Disable circuit 170 selectively enables and disables a data correction function of data correction circuit 154 in accordance with the present invention. The data correction circuit 154, when enabled, only operates if the parity of the encoded block is incorrect, in which case it corrects the most likely error in that block as the block leaves the post processor 141.

In FIG. 5, disable circuit 170 is depicted in the context of two different embodiments. In one embodiment, disable circuit 170 produces a disable signal in response to a state of a read gate input 172 to the data channel (labeled method #1 in FIG. 5). The disable circuit 170 includes or is coupled to a state detector (not shown) that detects a state change of the read gate input as the read gate input transitions from an active state to an inactive state. The state detector may, for example, be incorporated as part of the post processor 141, such as part of the data correction circuit 154. The disable circuit 170 generates the disable signal in response to this detected state change of the read gate input.

According to a second embodiment, disable circuit 170 produces a disable signal in response to the status of a counter 174, such as a byte counter (labeled method #2 in FIG. 5). The disable circuit 170, which may include one or both of the state detector or counter 174, communicates a disable signal to the data correction circuit 154 during a read operation to selectively disable data correction to the last block in the read operation.

In accordance with the present invention, it is assumed that the large block code is not actually decoded 12 bytes at a time. Doing so would be costly in terms of silicon area, additional pipelining, and sector data size granularity, which is a problem solved by the present invention. Rather, and according to one code implementation, 2 bytes are decoded at a time, with parity bits interspersed throughout the 12 byte block. Thus, the sector data size according to this embodiment is limited to 2 byte granularity, which is significantly better the 12 byte granularity of other approaches.

Figure 6:
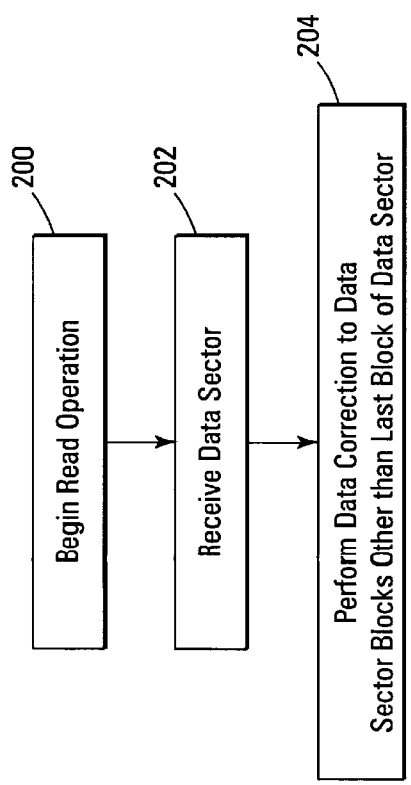
FIG. 6 illustrates various operations associated with performing a read operation in accordance with the principles of the present invention.

FIG. 6 depicts several operations implemented by the circuitry of FIG. 5 according to the principles of the present invention. In broad and general terms, a read operation is initiated 200 and an encoded data sector is received 202 for decoding. During decoding of the data sector, data correction (e.g., parity correction) is performed to data sector blocks other than the last block of the data sector. Data correction to the last block of the data sector is not performed in order to avoid possible data corruption when the needed number of bytes does not fit a modulus of the block size.

Figure 7:
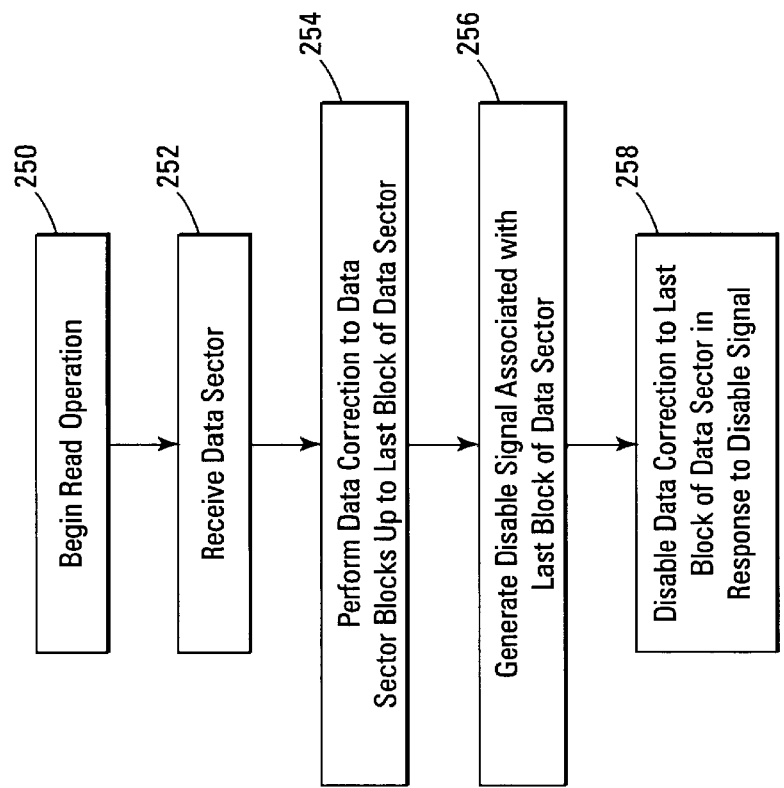
FIG. 7 illustrates various operations associated with performing a read operation in accordance with an embodiment of the present invention.

FIG. 7 depicts several operations implemented by the circuitry of FIG. 5 according to further principles of the present invention. As is depicted in FIG. 7, a read operation is initiated 250 and an encoded data sector is received 252 for decoding. During decoding of the data sector, data correction is applied 254 to data sector blocks up to, but excluding, the last block of the data sector. During the decoding process, a disable signal is generated 256 associated with the last block of the data sector. Data correction otherwise applied to the last data sector block using conventional schemes is disabled in response to the disable signal.

Figure 8:
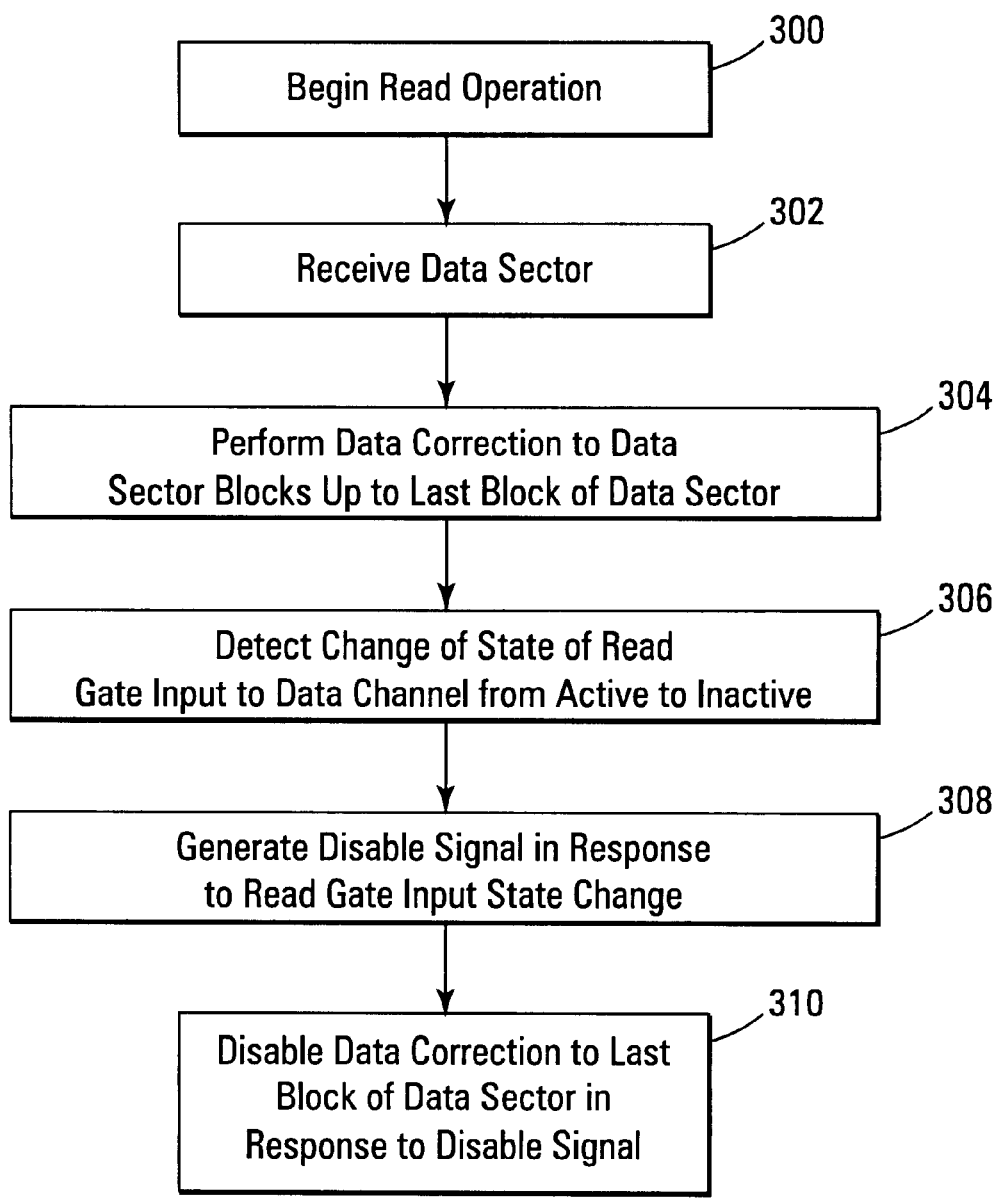
FIG. 8 illustrates various operations associated with selective disablement of a data correction function in accordance with one embodiment of the present invention.

FIG. 8 depicts several operations implemented by the circuitry of FIG. 5 according to an embodiment of the present invention. A read operation is initiated 300 and an encoded data sector is received 302 for decoding. During decoding of the data sector, data correction is applied 304 to data sector blocks up to, but excluding, the last block of the data sector. According to this embodiment, identifying the last block in a read operation involves detecting the state of the read gate input to the data channel. In particular, a change of state of the read gate input from active to inactive is detected 306.

When the read gate input goes active, a read operation begins. When the read gate input transitions to inactive, an internal timer in the channel delays the end of the read operation to account for decoder processing delay. As such, when the read gate input goes inactive, the channel disables parity corrections staring with the next block to be processed, which will be the last block of the sector. The transition of the read gate input from active to inactive states results in the generation 308 of a disable signal which is detected by the data correction circuit 154. Data correction to the last block of the data sector is disabled 310 in response to the disable signal.

Figure 10:
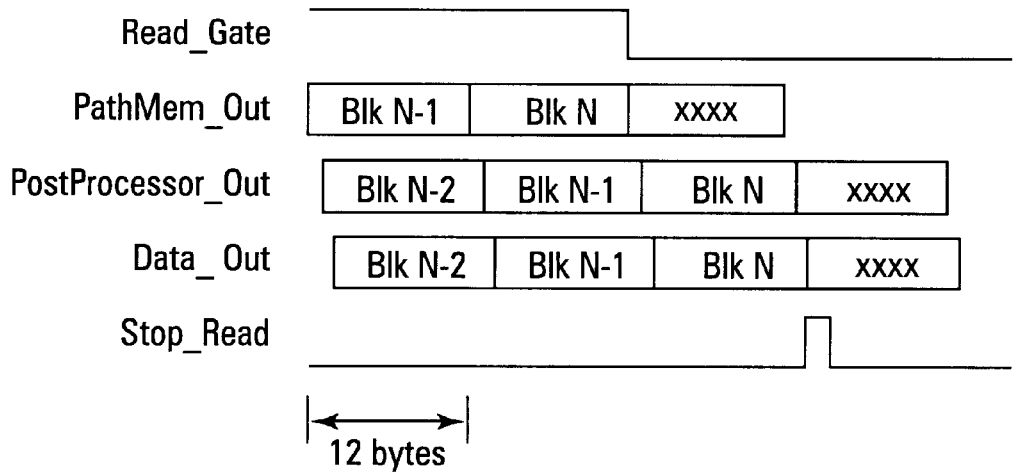
FIG. 10 is a timing diagram depicting timing details at the end of a typical read operation.
Figure 11:
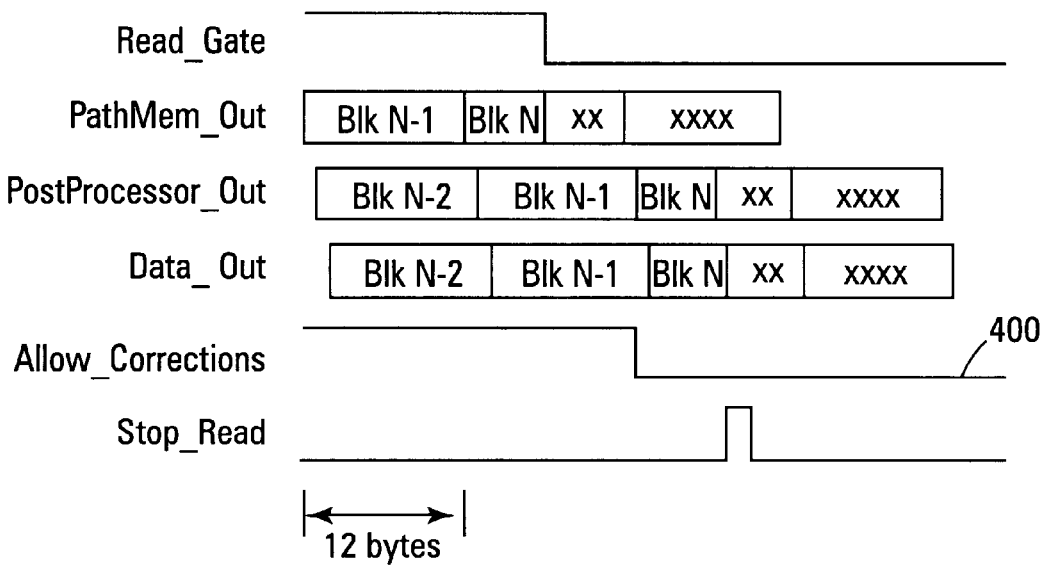
FIG. 11 is a timing diagram depicting timing details at the end of a read operation in accordance with an embodiment of the present invention.

FIGS. 10 and 11 are timing diagrams that illustrate timing details at the end of a read operation. FIG. 10 illustrates timing details according to a conventional approach, while FIG. 11 illustrates timing details depicting a disable signal implementation based on the state of the read gate input to the data channel. As is shown in FIG. 10, the read operation continues after the read gate goes inactive due to the readback latency introduced by the large block code. A certain amount of time later, the read circuitry actually shuts down and stops transferring data.

As is shown in FIG. 11, a disable signal 400 is introduced into the timing scheme. Disable signal 400 is communicated from the disable circuit 170 to the data correction circuit 154 shown in FIG. 5. The disable signal 400, when at a first state (i.e., high), enables the data correction circuit 154 to effect data corrections and, when at a second state (i.e., low), disables the data correction circuit 154 from effecting data corrections. When the read gate input goes inactive, the next encoded block passing through the post processor will not be subject to correction. This temporal relationship between the read gate input transition to an inactive state and deactivation of data correction for the next encoded block is due to the fact that the read circuitry continues to operate after the read gate input goes inactive according to this embodiment.

For channels having timing characteristics that preclude implementation of the above-described data correction disablement methodology, and in accordance with another embodiment, a counter-based approach for identifying the last block in a read operation may be employed. According to one such counter-based approach, a counter is used to keep track of the amount of data transferred out of the channel during a read operation together with knowledge of the total amount of data that will be read during the read operation. This information is used to determine if the total amount of data to be read is an integer multiple of the block size. If not, the data correction function is disabled at the appropriate decode of the transfer counter to ensure that the final block of data is not corrupted.

Figure 9:
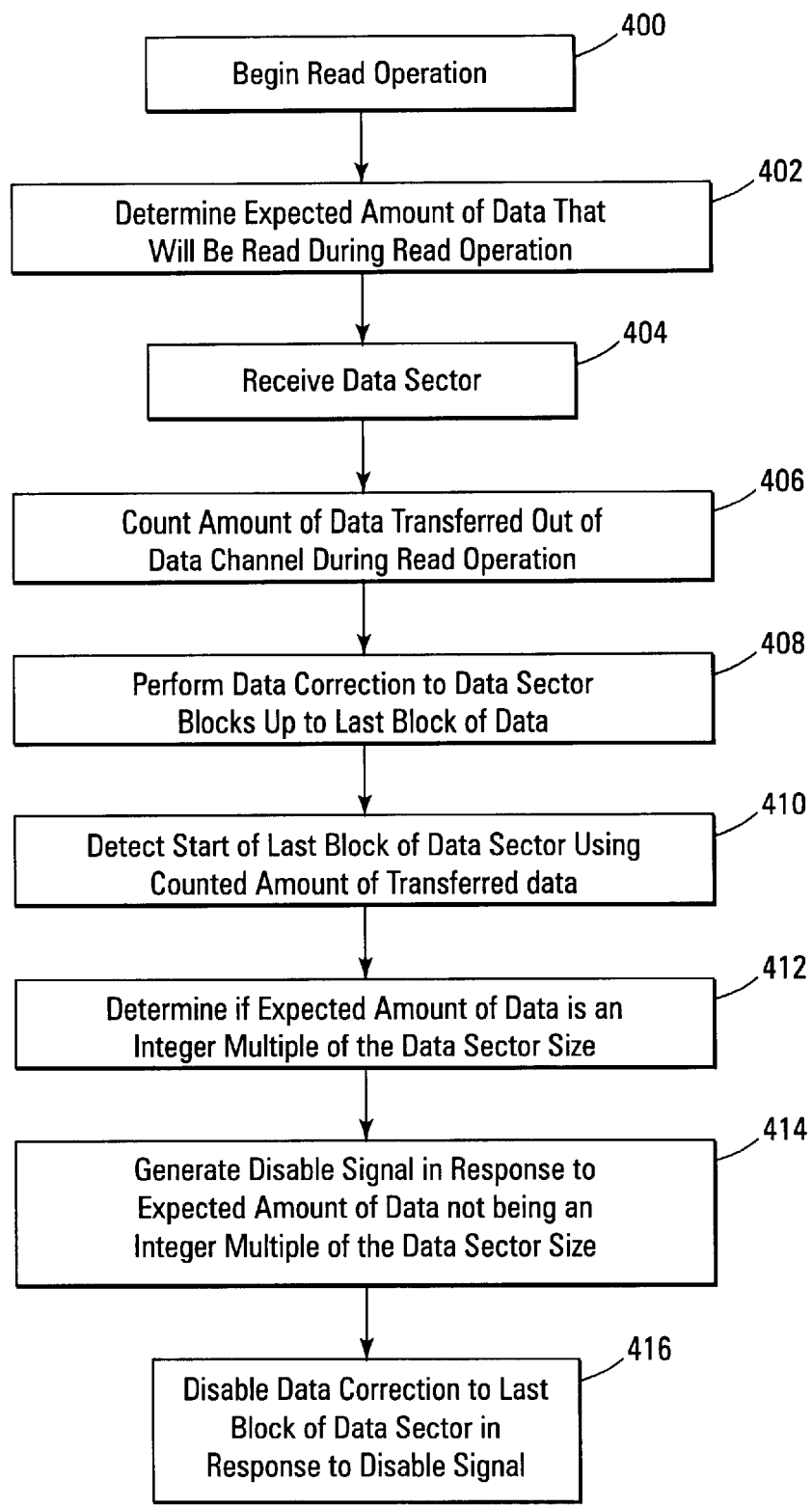
FIG. 9 illustrates various operations associated with selective disablement of a data correction function in accordance with another embodiment of the present invention.

As is depicted in FIG. 9, a read operation is initiated 400 and the expected amount of data that will be read during the read operation is determined 402. An encoded data sector is received 404 for decoding. The amount of data transferred out of the data channel during the read operation is counted 406. Data correction is enabled and, if indicated, performed 408 for data sector blocks up to the last block of the data sector. The start of the last block of the data sector is detected 410 using the counted amount of transferred data.

A computation is performed to determine 412 if the expected amount of data to be transferred is an integer multiple of the data sector size. A disable signal is generated 414 in response to the computation indicating that the expected amount of data to be transferred for the read operation is not an integer multiple of the data sector size. Having identified the starting bit of the last data sector block using this information, data correction to this last block is disabled 416 in response to the disable signal.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of transferring data between a read/write transducer coupled to a data channel and a data storage medium without necessity of a data sector block coding pad field, the method comprising:

receiving a data sector during a read operation;

generating a disable signal associated with a last block of the data sector; and disabling, in response to the disable signal, data correction to the last block of the data sector.

2. The method of claim 1, wherein disabling data correction comprises disabling parity correction.

3. The method of claim 1, further comprising enabling data correction for application to blocks of the data sector other than the last block.

4. The method of claim 1, wherein generating the disable signal further comprises identifying the last block of the data sector.

5. The method of claim 1, wherein generating the disable signal further comprises detecting a change of state of a read gate input into the data channel.

6. The method of claim 1, wherein generating the disable signal further comprises generating the disable signal in response to a read gate input into the data channel changing state from an active state to an inactive state.

7. The method of claim 1, wherein generating the disable signal further comprises:

enabling data correction to a block proceeding and adjacent to the last block;

generating the disable signal prior to or during application of data correction to the block proceeding and adjacent to the last block; and disabling data correction to the last block of the data sector in response to the disable signal.

8. The method of claim 1, wherein the data sector has a predefined size, and generating the disable signal further comprises:

determining an expected amount of data that will be read during the read operation;

counting an amount of data transferred out of the data channel during the read operation;

detecting a start of the last block using the counted amount of transferred data; and disabling data correction to the last block if the expected amount of data is not an integer multiple of the predefined size of the data sector.

9. An apparatus employed in a data channel for processing readback signal information developed from a data storage medium during a read operation, comprising:

a detector that detects an encoded data stream developed from a readback signal, the encoded data stream comprising a plurality of encoded data blocks; and a processor, coupled to the detector, comprising:

a parity check unit that detects parity of the encoded data blocks;

a data correction unit that operates on a particular encoded data block in response to the parity check unit detecting incorrect parity of the particular encoded data block; and a disable circuit coupled to the parity check unit and the data correction unit, the disable circuit generating a disable signal associated with a last block of the encoded data blocks, wherein the data correction unit disables data correction to the last block in response to the disable signal.

10. The apparatus of claim 9, wherein the disable circuit comprises an input coupled to a read gate input to the data channel.

11. The apparatus of claim 10, wherein the disable circuit comprises a detector that detects a state change of the read gate input, the disable circuit generating the disable signal in response to the detected state change of the read gate input.

12. The apparatus of claim 10, wherein the disable circuit comprises a detector that detects a state change of the read gate input, the disable circuit generating the disable signal in response to the read gate input changing state from an active state to an inactive state.

13. The apparatus of claim 10, wherein the disable circuit is coupled to a read gate input to the data channel and a timer in the data channel, the disable circuit generating the disable signal in response to a state change of the read gate input and transmitting the disable signal to the data correction unit upon expiration of the timer.

14. The apparatus of claim 13, wherein the timer expires after a period of time corresponding to a processing delay of a decoder coupled to an output of the processor.

15. The apparatus of claim 9, wherein the disable circuit comprises a counter.

16. The apparatus of claim 9, wherein the disable circuit comprises a counter and the disable circuit generates the disable signal in response to the counter identifying the last block of the encoded data blocks.

17. The apparatus of claim 9, wherein the disable circuit comprises a counter, the counter counting an amount of data transferred out of the data channel during the read operation and detecting a start of the last block using the counted amount of transferred data and an expected amount of data to be read during the read operation.

18. The apparatus of claim 17, wherein the disable circuit generates the disable signal in response to the expected amount of data not being an integer multiple of a predefined size of the data sector.

19. A data storing system, comprising:

a data storage disk;

a transducer supported by a support structure in proximity with the disk;

an actuator that provides relative movement between the transducer and the disk; and circuitry for processing readback signal information developed by the transducer during a read operation, the circuitry comprising:
  a detector that detects an encoded data stream developed from a readback signal, the encoded data stream comprising a plurality of encoded data blocks; and
  a processor, coupled to the detector, comprising:
    a parity check unit that detects parity of the encoded data blocks;
    a data correction unit that operates on a particular encoded data block in response to the parity check unit detecting incorrect parity of the particular encoded data block; and
    a disable circuit coupled to the parity check unit and the data correction unit, the disable circuit generating a disable signal associated with a last block of the encoded data blocks, wherein the data correction unit disables data correction to the last block in response to the disable signal.

20. The system of claim 19, wherein the disable circuit comprises an input coupled to a read gate input to the data channel and the disable circuit comprises a detector that detects a state change of the read gate input, the disable circuit generating the disable signal in response to the detected state change of the read gate input.

21. The system of claim 20, wherein the disable circuit comprises a detector that detects a state change of the read gate input, the disable circuit generating the disable signal in response to the read gate input changing state from an active state to an inactive state.

22. The system of claim 20, wherein the disable circuit is coupled to a read gate input to the data channel and a timer in the data channel, the disable circuit generating the disable signal in response to a state change of the read gate input and transmitting the disable signal to the data correction unit upon expiration of the timer.

23. The system of claim 19, wherein the disable circuit comprises a counter and the disable circuit generates the disable signal in response to the counter identifying the last block of the encoded data blocks.

24. The system of claim 19, wherein the disable circuit comprises a counter, the counter counting an amount of data transferred out of the data channel during the read operation and detecting a start of the last block using the counted amount of transferred data and an expected amount of data to be read during the read operation.

25. The system of claim 24, wherein the disable circuit generates the disable signal in response to the expected amount of data not being an integer multiple of a predefined size of the data sector.

* * * * *